(12) United States Patent
Kurian et al.

(10) Patent No.: US 10,459,958 B2
(45) Date of Patent: Oct. 29, 2019

(54) AUTOMATED RESPONSE SYSTEM USING SMART DATA

(71) Applicant: Bank of America Corporation, Charlotte, NC (US)

(72) Inventors: Manu Kurian, Dallas, TX (US); Paul Roscoe, Treuddyn Flintshire (GB); Jerzy Miernik, Allen, TX (US); Gopikrishna Nemalikanti, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 214 days.

(21) Appl. No.: 15/689,138

(22) Filed: Aug. 29, 2017

(65) Prior Publication Data

US 2019/0065581 A1    Feb. 28, 2019

(51) Int. Cl.
*G06F 15/16* (2006.01)
*G06F 16/332* (2019.01)
*G06Q 10/10* (2012.01)
*H04L 12/58* (2006.01)

(52) U.S. Cl.
CPC ....... *G06F 16/3329* (2019.01); *G06Q 10/107* (2013.01); *H04L 51/12* (2013.01)

(58) Field of Classification Search
CPC .... G06F 16/3329; G06Q 10/107; H04L 51/12
See application file for complete search history.

(56) References Cited

U.S. PATENT DOCUMENTS

| | | |
|---|---|---|
| 9,424,538 B1 | 8/2016 | Buddepalli et al. |
| 9,559,931 B2 | 1/2017 | Hitchcock et al. |
| 9,596,202 B1 | 3/2017 | Beach et al. |
| 9,621,580 B2 | 4/2017 | Buddepalli et al. |
| 9,715,496 B1 * | 7/2017 | Sapoznik ............ G06F 17/2715 |
| 2015/0365369 A1 | 12/2015 | Tokuda et al. |
| 2016/0014068 A1 | 1/2016 | Farkas |
| 2016/0266939 A1 | 9/2016 | Shear et al. |
| 2016/0277336 A1 | 9/2016 | Sachtjen et al. |
| 2016/0281607 A1 | 9/2016 | Asati et al. |

(Continued)

*Primary Examiner* — John B Walsh
(74) *Attorney, Agent, or Firm* — Banner & Witcoff, Ltd.; Michael A. Springs

(57) ABSTRACT

Aspects of the disclosure relate to analyzing smart data using an automated response system. A computing platform may receive, from a user device, user feedback information comprising user feedback corresponding to an enterprise organization. Thereafter, the computing platform may identify, based on the user feedback information, identification information comprising a sender of the user feedback and an issue corresponding to the user feedback. Then, the computing platform may retrieve, from a hierarchical rules server and based on the identification information, hierarchy information comprising a hierarchy ranking of a plurality of automated responses. Subsequently, the computing platform may determine, based on analyzing the hierarchy information and the user feedback, an automated response from the plurality of automated responses. Next, the computing platform may generate one or more commands directing an external response server to execute the automated response. Then, the computing platform may transmit the one or more commands.

20 Claims, 10 Drawing Sheets

(56) References Cited

U.S. PATENT DOCUMENTS

| | | |
|---|---|---|
| 2016/0300235 A1 | 10/2016 | Boyle et al. |
| 2016/0315897 A1 | 10/2016 | Vitaldevara et al. |
| 2016/0321661 A1 | 11/2016 | Hammond et al. |
| 2016/0323279 A1 | 11/2016 | Raleigh |
| 2016/0323296 A1 | 11/2016 | Daniell et al. |
| 2016/0323732 A1 | 11/2016 | Raleigh |
| 2016/0323771 A1 | 11/2016 | Raleigh |
| 2016/0330567 A1 | 11/2016 | Raleigh |
| 2016/0335633 A1 | 11/2016 | Joyce et al. |
| 2016/0337799 A1 | 11/2016 | Johnson |
| 2016/0337883 A1 | 11/2016 | Raleigh et al. |
| 2016/0342992 A1 | 11/2016 | Lee |
| 2016/0344604 A1 | 11/2016 | Raleigh et al. |
| 2016/0359665 A1 | 12/2016 | Raleigh |
| 2016/0359872 A1 | 12/2016 | Yadav et al. |
| 2016/0373588 A1 | 12/2016 | Raleigh et al. |
| 2016/0380942 A1 | 12/2016 | Salpe et al. |
| 2017/0006010 A1 | 1/2017 | Miu |
| 2017/0019970 A1 | 1/2017 | Chemel et al. |
| 2017/0026389 A1 | 1/2017 | Gatti |
| 2017/0026411 A1 | 1/2017 | Gatti |
| 2017/0061430 A1 | 3/2017 | Matthews et al. |
| 2017/0078922 A1 | 3/2017 | Raleigh et al. |
| 2017/0083845 A1 | 3/2017 | Karcher et al. |
| 2017/0086279 A1 | 3/2017 | Chemel et al. |
| 2017/0116403 A1 | 4/2017 | Bouse et al. |
| 2017/0124296 A1 | 5/2017 | Baldwin et al. |
| 2017/0124297 A1 | 5/2017 | Baldwin et al. |
| 2017/0124298 A1 | 5/2017 | Baldwin et al. |
| 2017/0124299 A1 | 5/2017 | Baldwin et al. |
| 2017/0124300 A1 | 5/2017 | Baldwin et al. |
| 2017/0124301 A1 | 5/2017 | Baldwin et al. |
| 2017/0124302 A1 | 5/2017 | Baldwin et al. |
| 2017/0124303 A1 | 5/2017 | Baldwin et al. |
| 2017/0126597 A1 | 5/2017 | Hitchcock et al. |
| 2017/0134435 A1 | 5/2017 | Kling et al. |
| 2017/0142049 A1 | 5/2017 | Ganin et al. |
| 2017/0168566 A1 | 6/2017 | Osterhout et al. |
| 2017/0201850 A1 | 7/2017 | Raleigh et al. |
| 2017/0206529 A1 | 7/2017 | Raleigh |
| 2017/0208459 A1 | 7/2017 | Raleigh et al. |
| 2017/0213005 A1 | 7/2017 | Cox et al. |
| 2017/0215073 A1 | 7/2017 | Raleigh |
| 2017/0220757 A1 | 8/2017 | Cox et al. |
| 2017/0220758 A1 | 8/2017 | Cox et al. |
| 2017/0223516 A1 | 8/2017 | Raleigh |
| 2017/0235786 A9 | 8/2017 | Faith et al. |
| 2017/0235848 A1 | 8/2017 | Van Dusen et al. |
| 2017/0235885 A1 | 8/2017 | Cox |
| 2017/0235886 A1 | 8/2017 | Cox et al. |
| 2017/0235893 A1 | 8/2017 | Cox et al. |
| 2017/0235894 A1 | 8/2017 | Cox et al. |
| 2017/0235895 A1 | 8/2017 | Cox |
| 2017/0235906 A1 | 8/2017 | Dorris et al. |
| 2017/0236063 A1 | 8/2017 | Dorris et al. |
| 2018/0054523 A1* | 2/2018 | Zhang ............... H04M 3/5166 |
| 2018/0365026 A1* | 12/2018 | Jernigan ............... H04L 51/02 |

* cited by examiner

AUTOMATED RESPONSE SYSTEM USING SMART DATA

BACKGROUND

Aspects of the disclosure relate to data processing, artificial intelligence, knowledge processing, and computer-implemented rule-based reasoning having specific pattern matching or control techniques. In particular, one or more aspects of the disclosure relates to analyzing smart data using an automated response system.

In some instances, a support system for an enterprise organization may receive user feedback about the enterprise organization. The user feedback may describe a vast range of issues, and the system may solve each issue differently. As the enterprise organization grows more complex, the amount of user feedback, including the amount of issues and solutions associated with the user feedback, may increase exponentially. Therefore, the system may have difficulty identifying connections between user feedback information as the amount of user feedback increases. Further, the system may have difficulty leveraging the user feedback information to identify new and different solutions for the vast range of issues.

SUMMARY

Aspects of the disclosure provide effective, efficient, scalable, and convenient technical solutions that address and overcome the technical problems associated with analyzing smart data using an automated response system.

In accordance with one or more embodiments, a computing platform having at least one processor, a memory, and a communication interface may receive, by the at least one processor, via the communication interface, and from a user device, user feedback information comprising user feedback corresponding to an enterprise organization. Thereafter, the computing platform may identify, based on the user feedback information, identification information comprising a sender of the user feedback and an issue corresponding to the user feedback. Then, the computing platform may retrieve, from a hierarchical rules server and based on the identification information, hierarchy information comprising a hierarchy ranking of a plurality of automated responses. Subsequently, the computing platform may determine, based on analyzing the hierarchy information and the user feedback, an automated response from the plurality of automated responses. Next, the computing platform may generate, by the at least one processor, one or more commands directing an external response server to execute the automated response. Then, the computing platform may transmit, via the communication interface and to the external response server, the one or more commands directing an external response server to execute the automated response.

In some embodiments, the computing platform may retrieve, from the hierarchical rules server and based on the identification information, historical information corresponding to the sender of the user feedback. Subsequently, the determining the automated response from the plurality of automated responses may be further based on the historical information. In some embodiments, the historical information may comprise information indicating a number of times the sender of the user feedback submitted previous user feedback associated with the issue. In some embodiments, the historical information of the issue may comprise historical information from a plurality of user feedback and from a plurality of different senders.

In some embodiments, the computing platform may determine, based on the user feedback information, a biometric factor corresponding to the user feedback. Subsequently, the determining the automated response from the plurality of automated responses may be based on the biometric factor. In some embodiments, the receiving the user feedback information may comprise receiving the user feedback information from the user device via an email feedback system, a text feedback system, or an interactive voice response feedback system.

In some embodiments, the hierarchy information may further comprise a hierarchy ranking of a plurality of issues. Subsequently, the computing platform may determine, based on comparing the issue with the hierarchy ranking of the plurality of issues, the hierarchy ranking of the issue. Then, the determining the automated response from the plurality of automated responses may be further based on the hierarchy ranking of the issue. In some embodiments, the computing platform may receive, via the communication interface and from the external response server, a status of the user feedback. Subsequently, the computing platform may change, based on the status of the user feedback, the automated response in the hierarchy ranking of the plurality of automated responses.

In some embodiments, the computing platform may generate a web user interface corresponding to the user feedback, wherein the web user interface indicates the automated response and a status update for the user feedback. Subsequently, the computing platform may transmit, via the communication interface and to the user device, the web user interface.

In some embodiments, the computing platform may determine a trend for each of the plurality of automated responses, wherein the trend corresponds to an efficiency of a corresponding automated response from the plurality of automated responses. Thereafter, the computing platform may change, based on the trend for each of the plurality of automated responses, the hierarchy ranking of the plurality of automated responses.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
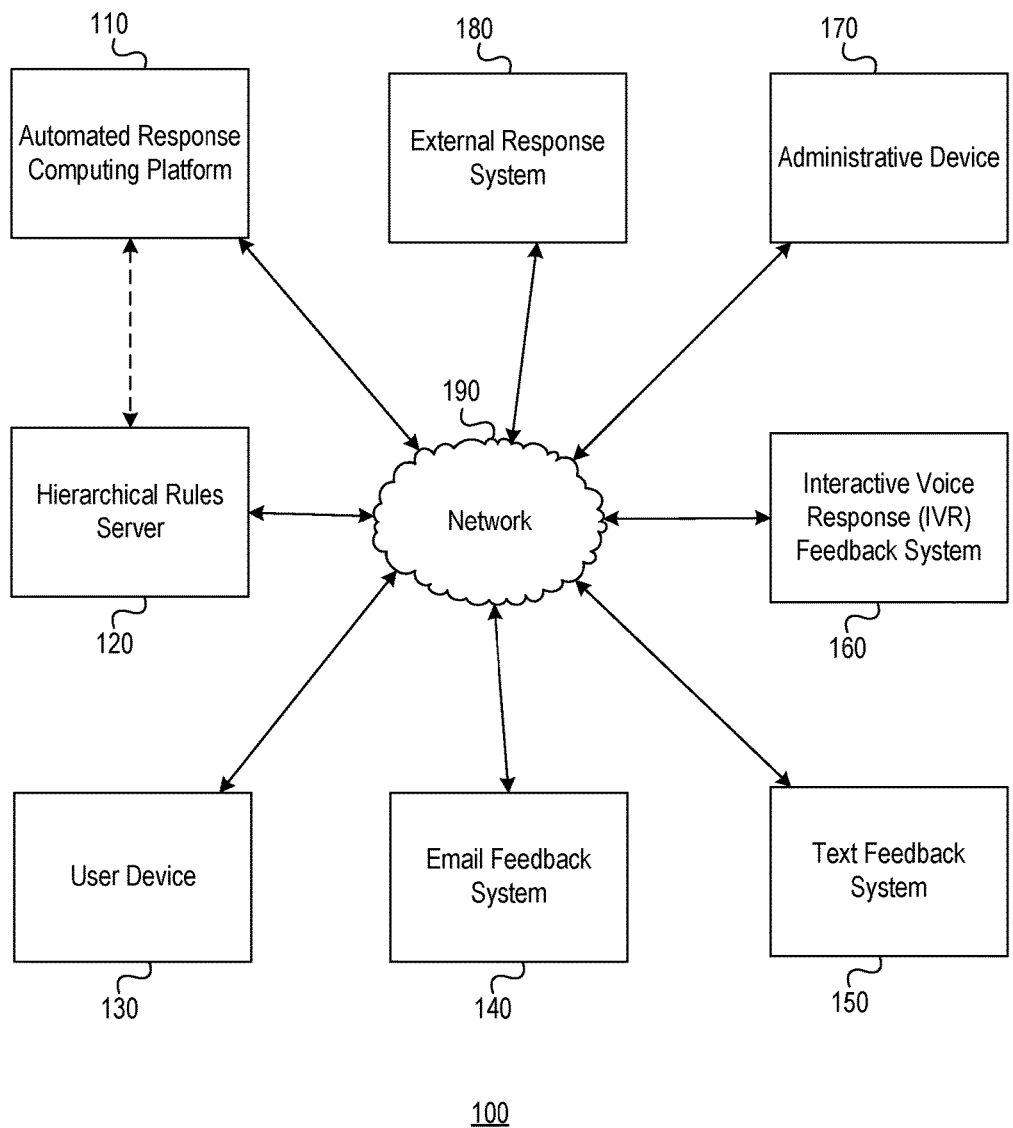
FIGS. 1A, 1B, and 1C depict an illustrative computing environment for analyzing smart data using an automated response system in accordance with one or more example embodiments.
Figure 1B:
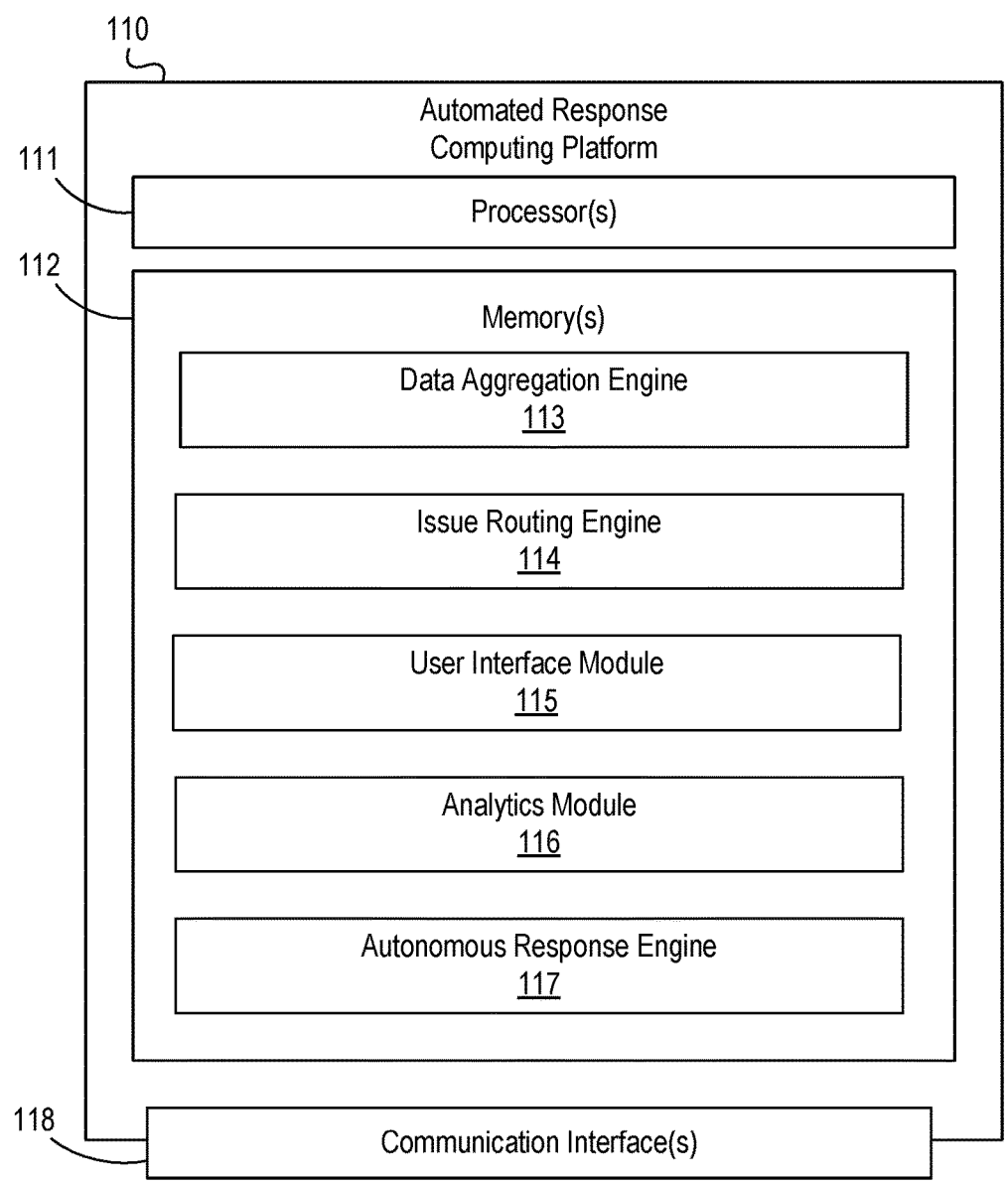

FIGS. 1A and 1B depict an illustrative computing environment for analyzing smart data using an automated response system in accordance with one or more example embodiments. Referring to FIG. 1A, computing environment 100 may include one or more computing devices and/or other computer systems. For example, computing environment 100 may include an automated response computing platform 110, a hierarchical rules server 120, a user device 130, an email feedback system 140, a text feedback system 150, an interactive voice response (IVR) feedback system 160, an administrative device 170, and/or an external response system 180.

Automated response computing platform 110 may be configured to analyze user feedback and smart data by controlling and/or directing actions of other devices and/or computer systems, and/or perform other functions, as discussed in greater detail below. In some instances, automated response computing platform 110 may perform and/or provide one or more techniques to analyze user feedback and smart data.

Hierarchical rules server 120 may be configured to store and/or maintain hierarchical rules information to analyze user feedback and smart data. For example, hierarchical rules server 120 may be configured to store and/or maintain hierarchy information corresponding to clients, issues, actions in response to issues, and/or historical user information. In some instances, the hierarchical rules server 120 might not be another entity, but the functionalities of the hierarchical rules server 120 may be included within the automated response computing platform 110.

User device 130 may be configured to be used by one or more users of computing environment 100. For example, the user device 130 may be configured to display, present, and/or otherwise provide one or more user interfaces that enable one or more users to provide user feedback corresponding to an enterprise organization. The user device 130 may receive, from the one or more users, user input or selections. Further, the user device 130 may send the user input or selections to the automated response computing platform 110 and/or one or more other computer systems and/or devices in computing environment 100. The user device 130 may receive, from the automated response computing platform 110 and/or one or more other computer systems and/or devices in computing environment 100, information or data in response to the user input or selection.

In some examples, the user device 130 may receive, from one or more users, user feedback information indicating feedback corresponding to an enterprise organization. After receiving the user feedback information from the user, the user device 130 may transmit the user feedback information to an email feedback system 140, a text feedback system 150, and/or an interactive voice response (IVR) feedback system 160. In some embodiments, the user device 130 may include a microphone and/or voice recording system. For example, the microphone and/or voice recording system may be used to record a voice recording from the user. The voice recording may be a recorded voice message of the user feedback.

Email feedback system 140 may be configured to receive and transmit user feedback information. For example, the user device 130 may transmit one or more emails to the email feedback system 140. The emails may indicate user feedback corresponding to the enterprise organization. The email feedback system 140 may receive the emails from the user device 130 and may transmit the emails to the automated response computing platform 110. In some instances, the email feedback system 140 may receive a plurality of emails from a plurality of different user devices. Each user device, such as user device 130, may correspond to a different user.

Text feedback system 150 may be configured to receive and transmit user feedback information. For example, the user device 130 may transmit one or more text messages to the text feedback system 150. The text messages may indicate user feedback corresponding to the enterprise organization. The text feedback system 150 may receive the text messages from the user device 130 and may transmit the text messages to the automated response computing platform 110. In some instances, the text feedback system 150 may receive a plurality of text messages from a plurality of different user devices. Each user device, such as user device 130, may correspond to a different user.

Interactive voice response (IVR) feedback system 160 may be configured to receive and transmit user feedback information. For example, the user device 130 may transmit one or more voice messages to the IVR feedback system 160. The voice messages may indicate user feedback corresponding to the enterprise organization. The IVR feedback system 160 may receive the voice messages from the user device 130, and may convert the voice messages into text. Additionally, and/or alternatively, the IVR feedback system 160 may transmit the converted text messages to the automated response computing platform 110. In some instances, the IVR feedback system 160 may receive a plurality of voice messages from a plurality of different user devices. Each user device, such as user device 130, may correspond to a different user.

Administrative device 170 may be configured to be used by one or more users of computing environment 100. For example, the administrative device 170 may be configured to display, present, and/or otherwise provide one or more user interfaces that enable a user (e.g., an administrator) to monitor a status of the user feedback. The administrative device 170 may receive, from the one or more administrators, user input or selections and send the user input or selections to the automated response computing platform 110 and/or one or more other computer systems and/or devices in computing environment 100. The administrative device 170 may receive, from the automated response computing platform 110 and/or one or more other computer systems and/or devices in computing environment 100, information or data in response to the user input or selection.

External response system 180 may be a computing system configured to offer any desired service, and may execute an automated response. For example, the external response system 180 may execute an automated response based on the user feedback. Additionally, and/or alternatively, external response system 180 may provide one or more interfaces that facilitate communications with other systems (e.g., automated response computing platform 110, hierarchical rules server 120, a user device 130, an email feedback system 140, a text feedback system 150, IVR feedback system 160, an administrative device 170, and an external response system 180) in computing environment 100. In some instances, the external response system 180 may receive, from the automated response computing platform 110, one or more commands to execute an automated response based on the user feedback, as discussed in greater detail below. In some examples, the external response system 180 may include a plurality of automated response systems, and each automated response system may execute a plurality of different automated responses based on the user feedback.

In one or more arrangements, hierarchical rules server 120, user device 130, email feedback system 140, text feedback system 150, IVR feedback system 160, administrative device 170, and/or external response system 180 may be any type of computing device capable of providing a user interface, receiving input via the user interface, and communicating the received input to one or more other computing devices. For example, hierarchical rules server 120, user device 130, email feedback system 140, text feedback system 150, IVR feedback system 160, administrative device 170, and/or external response system 180 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of hierarchical rules server 120, user device 130, email feedback system 140, text feedback system 150, IVR feedback system 160, administrative device 170, and/or external response system 180 may, in some instances, be special-purpose computing devices configured to perform specific functions.

Computing environment 100 also may include one or more computing platforms. For example, and as noted above, computing environment 100 may include the automated response computing platform 110. As illustrated in greater detail below, the automated response computing platform 110 may include one or more computing devices configured to perform one or more of the functions described herein. For example, the automated response computing platform 110 may include one or more computers (e.g., laptop computers, desktop computers, servers, server blades, or the like).

Computing environment 100 also may include one or more networks, which may interconnect one or more of automated response computing platform 110, hierarchical rules server 120, user device 130, email feedback system 140, text feedback system 150, IVR feedback system 160, administrative device 170, and/or external response system 180. For example, computing environment 100 may include network 190. Network 190 may include one or more sub-networks (e.g., local area networks (LANs), wide area networks (WANs), or the like). For example, network 190 may include a private sub-network that may be associated with a particular organization (e.g., a corporation, financial institution, educational institution, governmental institution, or the like) and that may interconnect one or more computing devices associated with the organization. For example, automated response computing platform 110, hierarchical rules server 120, user device 130, email feedback system 140, text feedback system 150, IVR feedback system 160, administrative device 170, and/or external response system 180 may be associated with an enterprise organization, and a private sub-network included in network 190 and associated with and/or operated by the organization may include one or more networks (e.g., LANs, WANs, virtual private networks (VPNs), or the like) that interconnect automated response computing platform 110, hierarchical rules server 120, user device 130, email feedback system 140, text feedback system 150, IVR feedback system 160, administrative device 170, and/or external response system 180. Network 190 also may include a public sub-network that may connect the private sub-network and/or one or more computing devices connected thereto (e.g., automated response computing platform 110, hierarchical rules server 120, user device 130, email feedback system 140, text feedback system 150, IVR feedback system 160, administrative device 170, and/or external response system 180) with one or more networks and/or computing devices that are not associated with the organization.

Referring to FIG. 1B, automated response computing platform 110 may include one or more processors 111, memory 112, and communication interface 118. A data bus may interconnect processor(s) 111, memory 112, and communication interface 118. Communication interface 118 may be a network interface configured to support communication between the automated response computing platform 110 and one or more networks (e.g., network 190). Memory 112 may include one or more program modules having instructions that when executed by processor(s) 111 cause the automated response computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the automated response computing platform 110 and/or by different computing devices that may form and/or otherwise make up the automated response computing platform 110. For example, memory 112 may have, store, and/or include a data aggregation engine 113, an issue routing engine 114, a user interface module 115, an analytics module 116, and an autonomous response engine 117. Autonomous response engine 117 may include instructions that direct and/or cause automated response computing platform 110 to analyze smart data and user feedback to determine an automated response, as discussed in greater detail below.

Data aggregation engine 113 may aggregate data used by the autonomous response engine 117 and/or the automated response computing platform 110. For example, after receiving the user feedback from the email feedback system 140, the text feedback system 150, and/or the interactive voice response feedback system 160, the data aggregation engine 113 may aggregate the user feedback. In some embodiments, the data aggregation engine 113 may store the user feedback used by the autonomous response engine 117 and/or the automated response computing platform 110 in determining an automated response and/or in performing other functions.

Issue routing engine 114 may route issues used by the autonomous response engine 117 and/or the automated response computing platform 110. For example, after receiving the user feedback from the email feedback system 140, the text feedback system 150, and/or the interactive voice response feedback system 160, the issue routing engine 114 may determine an issue corresponding to the user feedback. Based on the issue, the issue routing engine 114 may route the issue to the external response system 180.

User interface module 115 may generate a user interface for the user device 130 and/or the administrative device 170. For example, after receiving the user feedback from the email feedback system 140, the text feedback system 150, and/or the interactive voice response feedback system 160, the user interface module 115 may generate an interactive user interface for the user feedback. In some embodiments, based on the issue and/or status of the user feedback, the user interface module 115 may generate and update the user interface as the user feedback is analyzed by the automated response computing platform 110.

Analytics module 116 may receive and use hierarchy information to analyze the user feedback. For example, after receiving the user feedback from the email feedback system 140, the text feedback system 150, and/or the interactive voice response feedback system 160, the analytics module 116 may receive hierarchy information from the hierarchical rules server 120. In some instances, based on the hierarchy information, the analytics module 116 may analyze and determine an automated response for the user feedback.

Figure 1C:
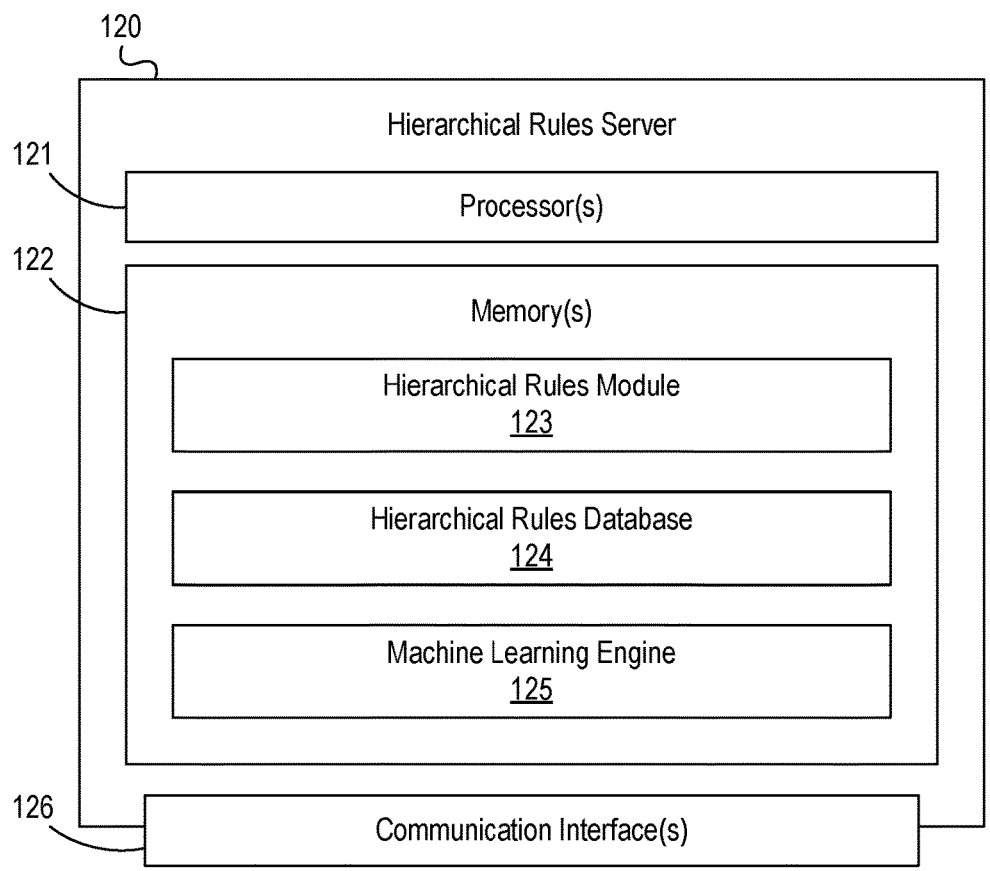

Referring to FIG. 1C, hierarchical rules server 120 may include one or more processors 121, memory 122, and communication interface 126. A data bus may interconnect processor(s) 121, memory 122, and communication interface 126. Communication interface 126 may be a network interface configured to support communication between hierarchical rules server 120 and one or more networks (e.g., network 190). Memory 122 may include one or more program modules having instructions that when executed by processor(s) 121 cause the hierarchical rules server 120 to perform one or more functions described herein and/or one or more databases that may store and/or otherwise maintain information which may be used by such program modules and/or processor(s) 121. In some instances, the one or more program modules and/or databases may be stored by and/or maintained in different memory units of the hierarchical rules server 120 and/or by different computing devices that may form and/or otherwise make up the hierarchical rules server 120. For example, memory 122 may have, store, and/or include a hierarchical rules module 123, a hierarchical rules database 124, and a machine learning engine 125. Hierarchical rules server 120 may include instructions that direct and/or cause hierarchical rules server 120 to analyze user feedback and smart data to determine an automated response, as discussed in greater detail below. Hierarchical rules database 124 may store information used by the hierarchical rules module 123 and/or the hierarchical rules server 120 in analyzing user feedback, smart data, and/or in performing other functions. Machine learning engine 125 may have instructions that direct and/or cause the hierarchical rules server 120 to set, define, and/or iteratively redefine optimization rules, techniques and/or other parameters used by hierarchical rules server 120 and/or other systems in computing environment 100.

Figure 2A:
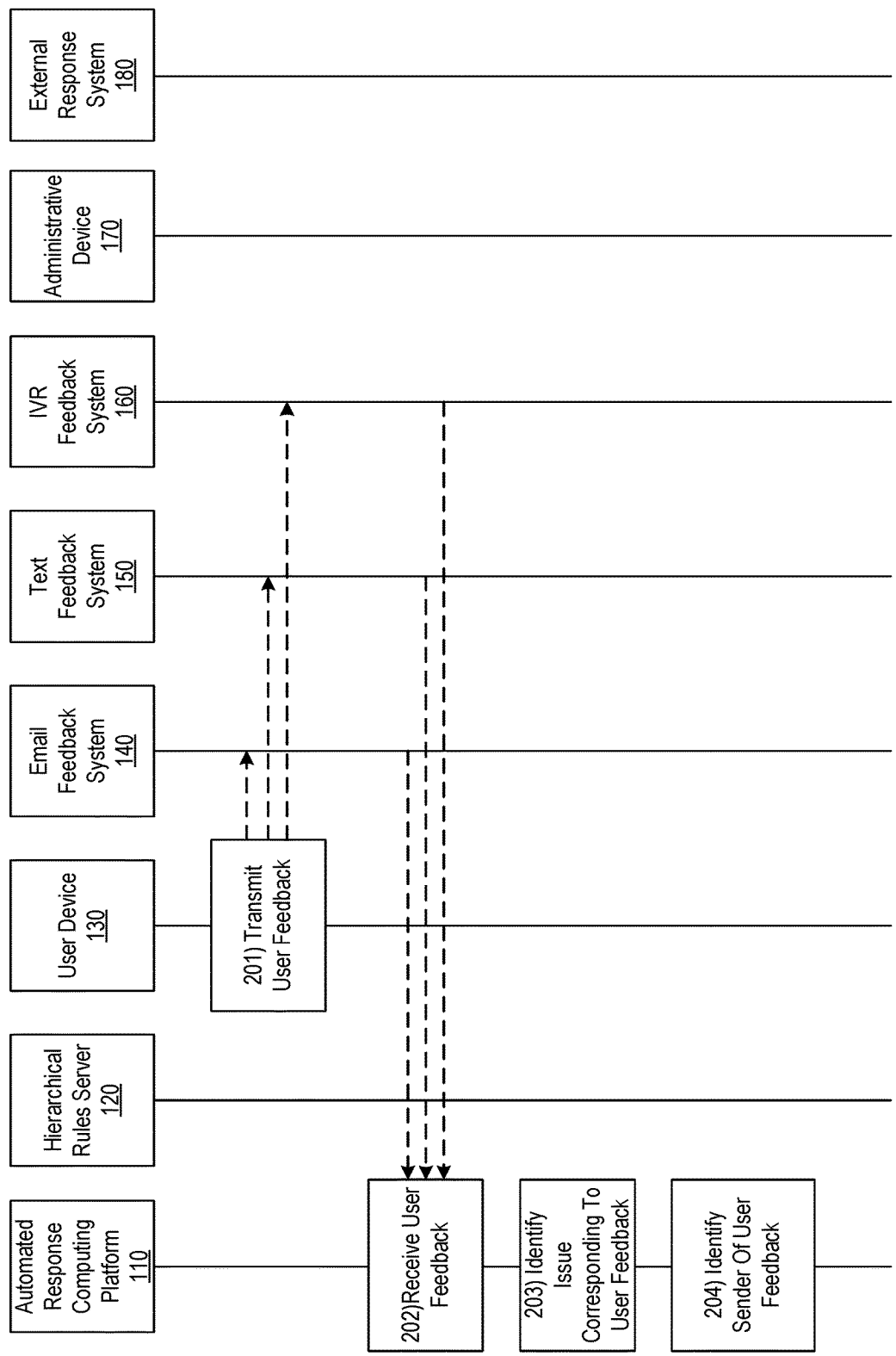
FIGS. 2A, 2B, 2C, 2D, and 2E depict an illustrative event sequence for analyzing smart data using an automated response system in accordance with one or more example embodiments.

FIGS. 2A, 2B, 2C, 2D, and 2E depict an illustrative event sequence for analyzing smart data using an automated response system in accordance with one or more example embodiments. Referring to FIG. 2A, at step 201, the user device 130 may transmit user feedback to the IVR feedback system 160, the email feedback system 140, and/or the text feedback system 150. For example, at step 201, the user device 130 may receive user feedback information from a user. FIG. 3 may display a sample user feedback template. For instance, as shown in FIG. 3, graphical user interface 300 may include one or more fields, controls, and/or other elements that may allow a user to input user feedback information. The graphical user interface 300 may allow a user to input a sender, subject, and/or content of the user feedback. For example, the sender may be the user (e.g., client of the enterprise organization) transmitting the user feedback. The subject may be a summary of the corresponding content of the user feedback. Additionally, in some instances, the subject may be a subject line of the email and/or text message. In some examples, the user feedback might not include a sender and/or subject. For example, the user device 130 may transmit an audio and/or an audiovisual file indicating the user feedback. The audio and/or audiovisual file might not include a subject and/or sender, but may include a phone number and/or other identification associated with the user device 130.

Further, the user feedback information may indicate information corresponding to user feedback about an enterprise organization. For example, a user, using the user device 130, may provide user feedback corresponding to the enterprise organization. User feedback may include surveys, rating systems, and/or questions about the mobile application. Additionally, in some examples, the user feedback may include an issue corresponding to the enterprise organization. The issue may indicate a problem, dilemma, question and/or other feedback concerning the enterprise organization. For example, the user feedback may indicate an issue, such as that a user's password has expired. A support system for the enterprise organization may use the user feedback information to assist the user in solving the issue indicated in the user feedback.

In some embodiments, the user device 130 may include text, email, and/or voice recording capabilities. For example, the user feedback may be in a plurality of formats, including text, email, audio, and/or audiovisual file formats. The user device 130 may receive the user feedback information as text feedback, email feedback, voice recorded feedback, and/or video recorded feedback. For instance, a microphone and/or a voice recording system may assist the user device 130 to record a voice recording of the user feedback. After user device 130 records the voice recording of the user feedback, the user device 130 may transmit the user feedback comprising the voice recording to the IVR feedback system 160. Additionally, and/or alternatively, the user device 130 may transmit user feedback information comprising textual information and/or other non-voice information. For example, the user device 130 may transmit an email or text message indicating the user feedback information to the email feedback system 140 and/or the text feedback system 150. Further, in some instances, the user device 130 may include only a voice recording of the user feedback, a combination of a voice recording of the user feedback and textual information and/or other non-voice information, or only textual information and/or other non-voice information.

At step 202, the automated response computing platform 110 may receive the user feedback information from the email feedback system 140, the text feedback system 150, and/or the IVR feedback system 160. In some examples, after receiving the user feedback information, the automated response computing platform 110 and/or the IVR feedback system may convert the user feedback, comprising the voice recording of the user feedback, into text feedback. In some instances, the email feedback system 140, the text feedback system 150, and/or the IVR feedback system 160 may receive a plurality of user feedback from a plurality of different user devices. The plurality of different user devices may be associated with the same user or a plurality of different users.

At step 203, the automated response computing platform 110 may identify an issue corresponding to the user feedback. For example, after receiving the user feedback at step 202, the automated response computing platform 110 may analyze the user feedback, such as the sender, subject and/or content of the user feedback, to identify an issue corresponding to the user feedback. In some embodiments, the user feedback may correspond to a support request indicating an issue. For example, the user may submit a support request or a support ticket for an issue, such as the user cannot log on an account due to an expired password. The automated response computing platform 110 may identify the issue, "expired password," by analyzing the subject and/or text of the support request.

In some examples, the administrative device 170 may transmit a multitude of known issues and/or problems corresponding to the enterprise organization. Each issue and/or problem may correspond with keywords and/or synonyms of the keywords. For example, the term "expired" may be a keyword for "expired password." Additionally, and/or alternatively, synonyms of "expired" may also be keywords used to identify the issue as "expired password." The automated response computing platform 110 may store, in memory 112, the multitude of issues corresponding to the enterprise organization. Then, after receiving the user feedback, the automated response computing platform 110 may parse through the user feedback for these keywords and/or synonyms. After identifying one or more keywords and/or synonyms within the user feedback, the automated response computing platform 110 may identify the issue from the corresponding keyword and/or synonyms.

In some instances, the automated response computing platform 110 may create a new issue based on the subject and/or content of the user feedback. For example, the automated response computing platform 110 may create a new issue from the subject and/or content of the user feedback. For instance, based on the phrases and/or words within the content of the user feedback (e.g., "does not work," "problem area," or "issue"), the automated response computing platform 110 may analyze the words and/or phrases, and create a new issue from the subject and/or content of the user feedback. Additionally, in some embodiments, the automated response computing platform 110 may parse through the user feedback and might not determine any keywords and/or synonyms. In such situations, the automated response computing platform 110 may create a new issue for the user feedback.

In some embodiments, the user feedback might not include a subject. For example, as mentioned earlier, the user feedback may be a voice recording, such as an audio or an audiovisual file. The automated response computing platform 110 may identify the issue from the content of the voice recording (e.g., the converted text file associated with the voice recording). Additionally, and/or alternatively, in some instances, while the user device 130 may transmit user feedback information including the sender and/or the subject, the automated response computing platform 110 may eventually receive the user feedback information without the sender and/or the subject. For example, the email feedback system 140 may transmit the content of the user feedback, but due to an error, the email feedback system 140 might not transmit the sender and/or subject of the user feedback. In such instances, the automated response computing platform 110 may analyze the content of the user feedback to identify the sender, subject, and/or issue of the user feedback.

At step 204, the automated response computing platform 110 may identify a sender of the user feedback. For example, automated response computing platform 110 may identify a sender of the user feedback based on an email address, phone number, and/or other identification information corresponding to the user transmitting the user feedback. Referring back to FIG. 3, in some instances, the sender information may be easily identifiable in the user feedback. For example, the automated response computing platform 110 may identify the sender from the email address and/or phone number associated with the user feedback. In some embodiments, when the sender information is not easily identifiable, the automated response computing platform 110 may analyze the user feedback, similar to step 203 above, to determine the sender of the user feedback. For example, the user feedback may be a text file that was converted from a voice recording. The automated response computing platform 110 may parse the user feedback (e.g., text file) to identify phrases and/or words of the user feedback. For instance, the automated response computing platform 110 may determine phrases from the user feedback (e.g., "My name is . . . " or "My email is . . . ") and use these phrases to identify a sender of the user feedback.

Figure 2B:
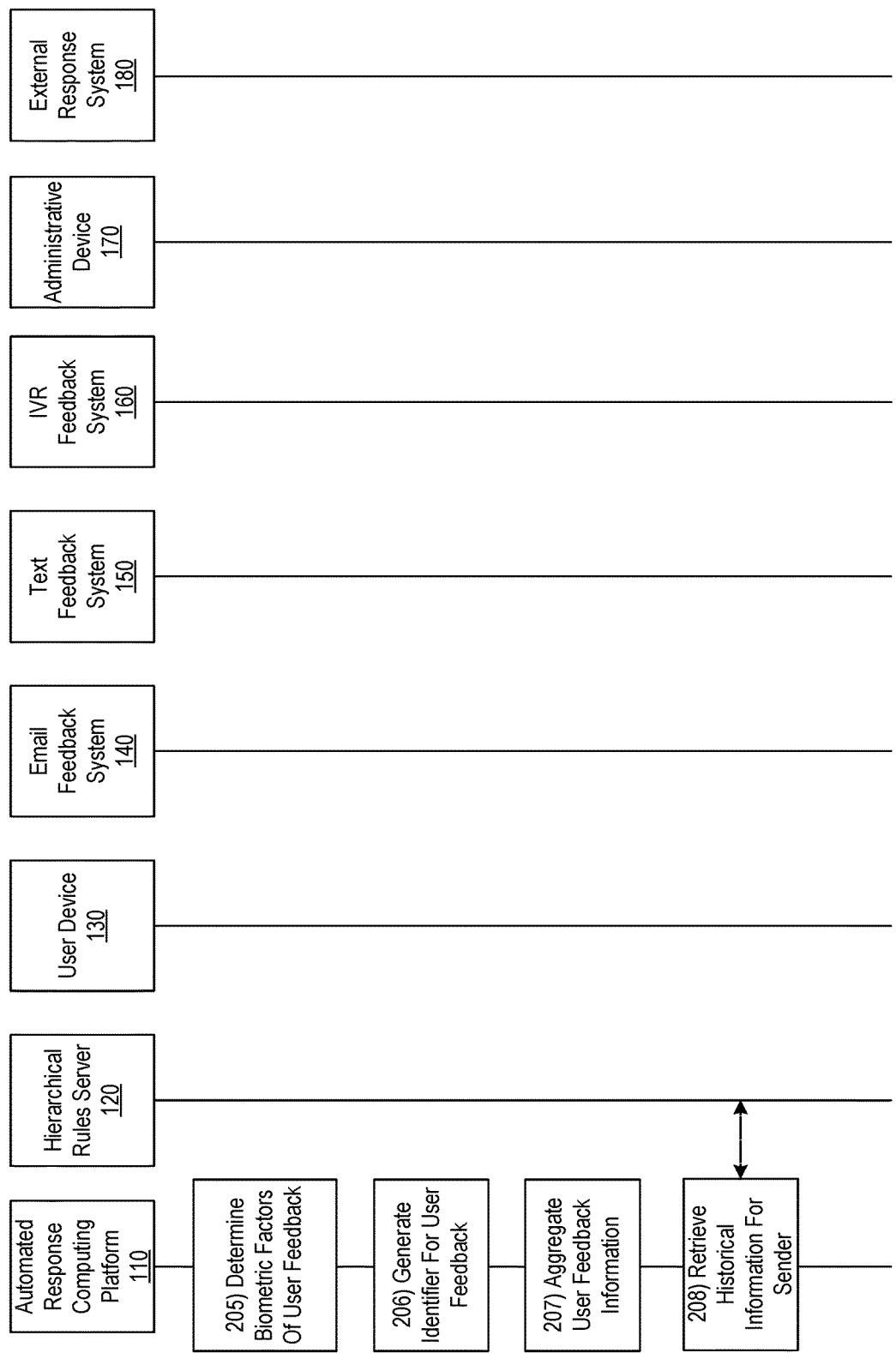
Figure 3:
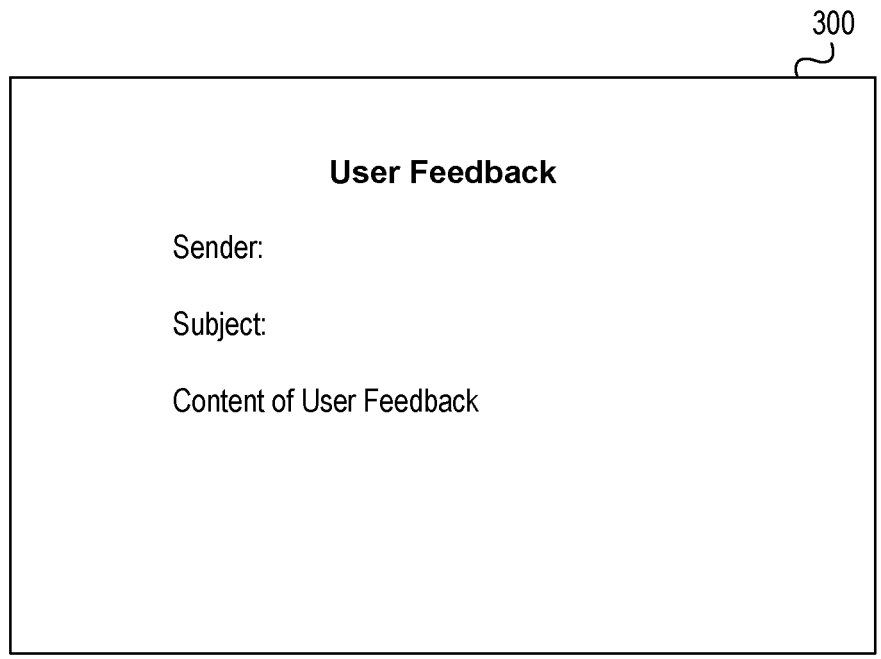
FIGS. 3 and 4 depict example graphical user interfaces for analyzing smart data using an automated response system in accordance with one or more example embodiments.

Referring to FIG. 2B, at step 205, the automated response computing platform 110 may determine biometric factors associated with the user feedback. For example, the automated response computing platform 110 may analyze the user feedback to determine biometric factors for the user feedback. In some examples, the automated response computing platform 110 may parse through the user feedback to determine words and/or phrases of the user feedback associated with the biometric factors. Additionally, and/or alternatively, the automated response computing platform 110 may determine the biometric factor based on the issue of the user feedback. For example, some issues, such as "employee appreciation," may be associated with a good or "happy" biometric factor, whereas some issues, such as "lost driver's license" or "lost passport," may be associated with a bad or "angry" biometric factor.

At step 206, the automated response computing platform 110 may generate an identifier for the user feedback. For example, at step 206, automated response computing platform 110 may generate an identifier, such as a tracking number, tracking identifier, and/or another identifier, for the received user feedback. In some instances, the automated response computing platform 110 may generate the identifier based on whether the received user feedback is from the email feedback system 140, the text feedback system 150, and/or the IVR feedback system 160. Further, in some embodiments, the automated response computing platform 110 may use the identifier to track the user feedback. For instance, the user may seek to track the status of the user feedback, such as a support ticket. The user, using user device 130, may transmit a request for a status of the user feedback, such as a request to determine whether the issue has been resolved. The automated response computing platform 110 may use the generated identifier for the user feedback to determine the status of the user feedback. Then, the automated response computing platform 110 may transmit the status of the user feedback to the user device 130.

At step 207, the automated response computing platform 110 may aggregate the user feedback information. For example, automated response computing platform 110 may receive a plurality of user feedback from a plurality of different user devices. At step 207, the automated response computing platform 110 may aggregate, using data aggregation engine 113, the plurality of user feedback based on the sender, issue, subject, biometric factors, and/or file format (e.g., email, text, audio, and/or audiovisual). In some examples, the automated response computing platform 110 may use the aggregated user feedback to determine the automated response for the user feedback. For instance, the automated response computing platform 110 may aggregate the user feedback from the same sender, and determine an automated response based on the aggregated user feedback.

Further, in some embodiments, the automated response computing platform 110 may aggregate the received user feedback for the same issue (e.g., "password expired"). In such embodiments, the automated response computing platform 110 may determine an automated response for the aggregated user feedback with the same issue. Additionally, in some instances, the automated response computing platform 110 may aggregate the received user feedback for the same subject. For example, a chain of emails may include the same subject line. The automated response computing platform 110 may aggregate the chain of emails that include the same subject line and determine an automated response for the chain of emails. Also, in some examples, the automated response computing platform 110 may aggregate the user feedback using the biometric factors. For example, many users may submit user feedback indicating appreciation for employees of the enterprise organization. The automated response computing platform 110 may aggregate the user feedback associated with the "happy" biometric factor, and then determine an automated response based on the biometric factor.

At step 208, the automated response computing platform 110 may retrieve historical information for the sender from the hierarchical rules server 120. For example, a sender of the user feedback may be a client of the enterprise organization. The automated response computing platform 110 may retrieve the historical information for the sender (e.g., client) based on the identified sender, identified issue, and/or subject of the user feedback. In some instances, the historical information may include previously received user feedback from the sender (e.g., client). For example, the sender, using user device 130 and/or another user device associated with the sender, may have previously transmitted user feedback indicating one or more issues. The automated response computing platform 110 may retrieve historical information, including the previous user feedback from the sender. In some embodiments, the historical information may include previously received user feedback related to the subject. For example, the received user feedback at step 202 may be from a chain of emails, text messages, and/or corresponding voice messages from the sender. The automated response computing platform 110 may retrieve historical information, including the chain of emails, text messages, and/or corresponding voice messages from the sender.

In some instances, the automated response computing platform 110 may retrieve a previous automated response and/or a previous biometric factor associated with the sender. For example, after receiving previous user feedback, the automated response computing platform 110 may have performed an automated action or automated response. Additionally, the automated response computing platform 110 may have associated the previously received user feedback with certain biometric factors.

Figure 2C:
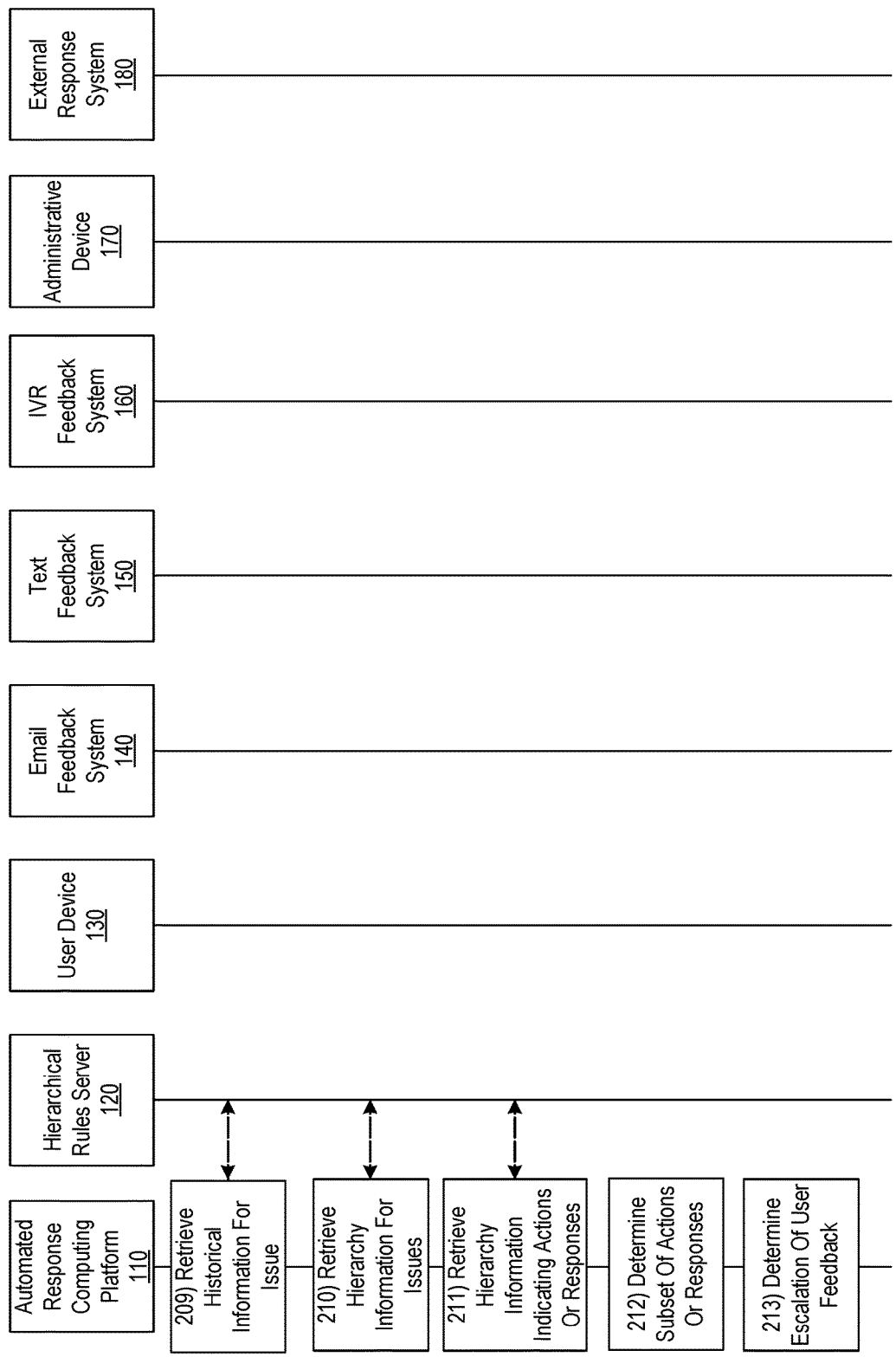

Referring to FIG. 2C, at step 209, the automated response computing platform 110 may retrieve historical information for the issue from the hierarchical rules server 120. For example, the automated response computing platform 110 may retrieve the historical information for the issue based on the identified sender, identified issue, and/or subject of the user feedback. In some examples, the historical information may include previously received user feedback for the issue. For example, multiple senders may have transmitted a plurality of previous user feedback about the issue. The automated response computing platform 110 may retrieve historical information, including the plurality of previous user feedback about the issue.

In some instances, the automated response computing platform 110 may retrieve a previous automated response and/or a previous biometric factor associated with the issue. For example, after receiving previous user feedback, the automated response computing platform 110 may have performed an automated action or automated response. Additionally, the automated response computing platform 110 may have associated previously received user feedback with certain biometric factors.

At step 210, the automated response computing platform 110 may retrieve hierarchy information for issues. For example, at step 210, automated response computing platform 110 may retrieve, from the hierarchical rules server 120, hierarchy information for the issues. For instance, each issue may be treated differently based on the importance of the issue for the enterprise organization. Some issues may be more important than other issues, and the hierarchy information may indicate a higher priority and/or a preference for the more important issues. Based on the higher priority and/or preference, the hierarchical rules server 120 may create, monitor, and/or update a hierarchy ranking of issues using the machine learning engine 125. At step 210, the automated response computing platform 110 may retrieve the hierarchy information indicating the hierarchy ranking of issues from the hierarchical rules server 120.

In some instances, after retrieving the hierarchy ranking of issues, the automated response computing platform 110 may determine a position of the issue corresponding to the user feedback within the hierarchy ranking of issues. For example, the hierarchy ranking of issues may include the issues and a corresponding ranking associated with each issue. After identifying the issue at step 203, the automated response computing platform 110 may compare the identified issue with hierarchy ranking of issues to determine the corresponding ranking of the issue. Additionally, and/or alternatively, in some examples, rather than a corresponding ranking associated with each issue, the ranking may correspond to a numerical (e.g., 1-100) and/or alphabetical (e.g., A-E) ranking. The automated response computing platform 110 may compare the identified issue at step 203 with the hierarchy ranking of issues to determine the numerical and/or alphabetical ranking of the issue. A high numerical or alphabetical ranking (e.g., 90 or A) may correspond to a high priority issue, whereas a low numerical or alphabetical ranking (e.g., 20 or E) may correspond to a low priority issue.

At step 211, the automated response computing platform 110 may retrieve, from the hierarchical rules server 120, hierarchy information indicating actions and/or responses for the issues. For example, based on the client and/or the issue, the hierarchical rules server 120 may create a hierarchy of automated responses to address and/or solve the issues. Some of the automated responses may be more severe or effective than others. And, based on the severity and/or effectiveness of the automated responses, the hierarchical rules server 120 may create, update, and/or monitor a hierarchy ranking of the automated responses using the machine learning engine 125. For instance, more severe automated responses, such as "contact supervisor," may be higher ranked than less severe automated responses, such as "send reminder email.

In some instances, the automated responses may route the issue associated with the user feedback to one or more external response systems 180. For example, the one or more external response systems 180 may be a support system, such as a help desk, that resolves issues for the enterprise organization. The external response systems 180

(e.g., the support systems) may be ranked by their effectiveness in resolving issues. Further, each external response systems 180 may perform unique actions and/or responses that range in severity. For instance, some external response systems 180 may perform more severe actions and/or responses, whereas other external response systems 180 may perform less severe actions and/or responses. As explained below, after determining the automated response, the automated response computing platform 110 may route, using the issue routing engine 114, the issue determined at step 203, to one or more support systems associated with the enterprise organization.

At step 212, the automated response computing platform 110 may determine a subset of the actions and/or responses from the hierarchy of actions and/or responses. For example, based on the ranking of the issue and/or the historical information for the user feedback, the automated response computing platform 110 may determine a subset of automated responses from the hierarchy of automated responses. In some embodiments, a higher ranked issue may be associated with a higher subset or part of the hierarchy ranking of the automated responses, whereas a lower ranked issue may indicate a lower subset or part of the hierarchy ranking of automated responses. Additionally, and/or alternatively, the automated response computing platform 110 may use the historical information to narrow the subset of automated responses.

In some instances, an automated response may be incompatible with particular issues and/or clients. For example, the automated action of "contacting a supervisor" may be incompatible with the issue "lost passport." As such, the automated response computing platform 110 may remove incompatible automated responses from the hierarchy ranking of automated responses prior to determining the subset of automated responses. Further, in some examples, an automated response may route the issue to an external response system 180 that is not capable of resolving the issue. As such, the automated response computing platform 110 may remove automated responses that route issues to external response systems 180 that are not capable of resolving the issue.

At step 213, the automated response computing platform 110 may determine an escalation of the user feedback. For example, after retrieving the historical information, the automated response computing platform 110 may escalate the user feedback based on the number of times the automated response computing platform 110 receives user feedback indicating the same client and/or the same issue. For example, by escalating the user feedback, the automated response computing platform 110 may move the subset of responses up the hierarchy ranking of responses. In some instances, the automated response computing platform 110 may determine the number of times the automated response computing platform 110 has received the user feedback indicating the same client and/or the same issue. Afterwards, as explained below, the automated response computing platform 110 may determine the automated response in the subset based on the number of times the automated response computing platform 110 received the user feedback.

Figure 2D:
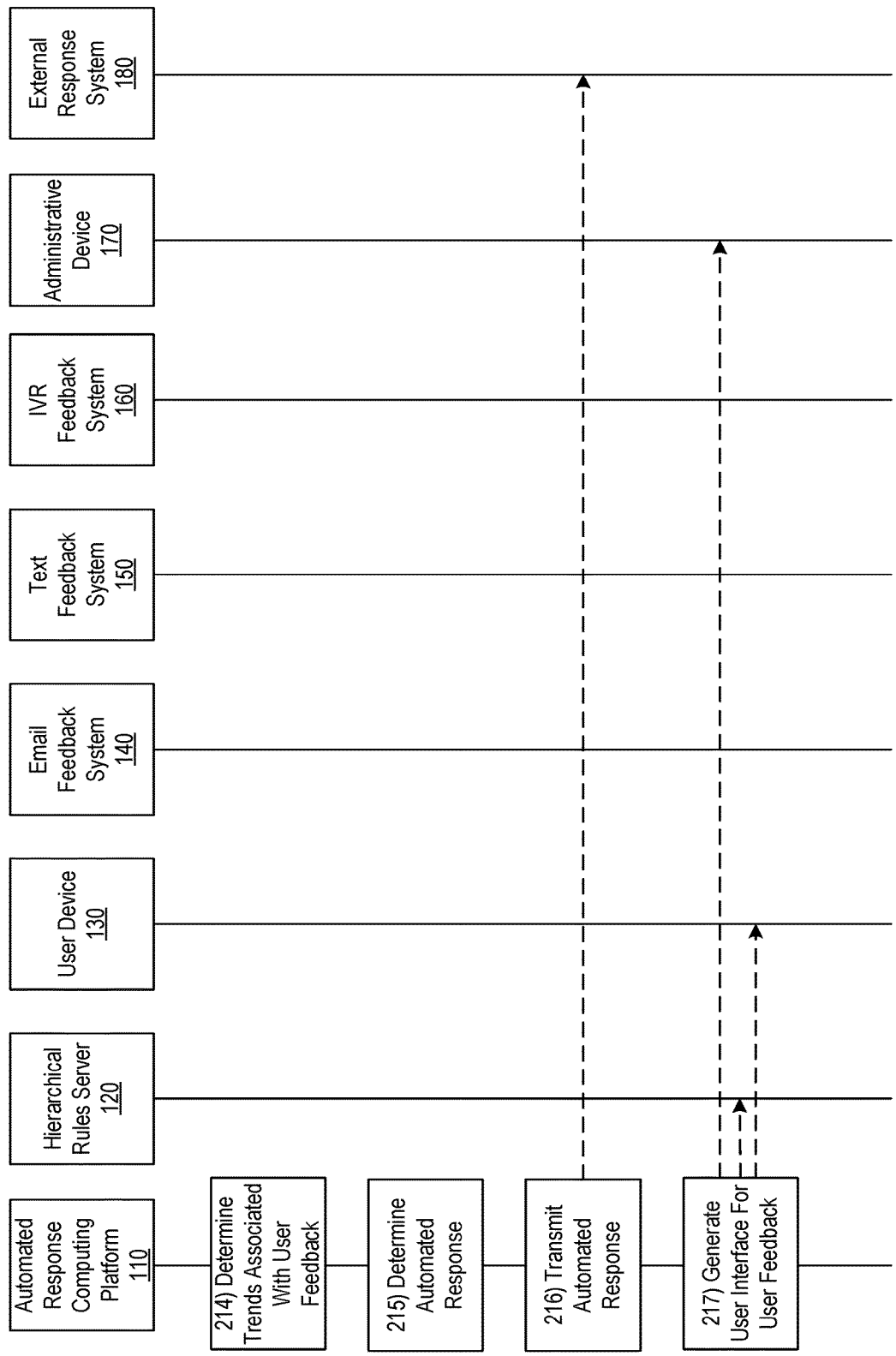

Referring to FIG. 2D, at step 214, the automated response computing platform 110 may determine trends associated with the user feedback. For example, the automated response computing platform 110 may analyze, using the analytics module 116, trends for the identified sender and/or client, identified issue, historical information, and/or automated responses to issues. Based on the historical information (e.g., past user feedback), the trends may indicate the performance (e.g., success, failure, and/or efficiency) associated with the identified client, identified issue, and/or the automated responses. In some embodiments, the automated response computing platform 110 may determine the performance by the number of received user feedback describing the particular issue and/or the particular client over a period of time. For example, if the number surpasses a pre-defined threshold for a period of time, the automated response computing platform 110 may determine that the actions and/or responses that are in response to the issue might not be effective. Additionally, if the amount is below the pre-defined threshold for a period of time, the automated response computing platform 110 may determine the action and/or response that are in response to the issue may be effective.

In some instances, the automated response computing platform 110 may determine the trends for the identified client, the identified issue, and/or the identified automated response. For example, the automated response computing platform 110 may determine the performance of the automated responses for a plurality of issues. Based on the performance, the automated response computing platform 110 may determine that particular automated responses may be more or less effective for particular issues. Additionally, and/or alternatively, the automated response computing platform 110 may determine the performance of the automated responses for a plurality of clients. Based on the performance, the automated response computing platform 110 may the determine that particular automated responses may be more or less effective for particular clients. Also, the automated response computing platform 110 may determine the trends for the automated responses. For example, the automated response computing platform 110 may determine the performance of the automated response for a plurality of clients over a plurality of issues. Based on the performance, the automated response computing platform 110 may the determine that the automated response may be more or less effective for particular issues and/or particular clients.

At step 215, the automated response computing platform 110 may determine the automated response for the user feedback. For example, the automated response computing platform 110 may determine the automated response based on the determined subset of actions and/or responses, the escalation of user feedback, the biometric factor, and/or the trends associated with the user feedback. In some instances, the automated response computing platform 110 may first determine whether to change the subset of actions and/or responses based on the escalation of the user feedback (e.g., moving up the subset of actions and/or responses in the hierarchy ranking). Afterwards, the automated response computing platform 110 may determine, from the trends at step 214, the effectiveness for each of the actions and/or responses in the subset. The automated response computing platform 110 may determine the action and/or response from the subset based on the trends for the identified issue and/or the identified client. In some examples, the automated response computing platform 110 may determine the automated response and/or action in the subset based on the number of times the automated response computing platform 110 receives the user feedback indicating the client and/or issue. For instance, the automated response computing platform 110 may select a different and/or more severe automated response each time the automated response computing platform 110 receives user feedback indicating the client and/or issue.

In some embodiments, the automated response computing platform 110 may determine the automated response in the subset based on the biometric factor associated with the user feedback. For example, based on a "good" or "happy" biometric factor, the automated response computing platform 110 may select a less severe automated response from the subset of automated responses. In other examples, based on a "bad" or "angry" biometric factor, the automated response computing platform 110 may select a more severe automated response.

In some instances, computing environment 100 may include a plurality of different external response systems 180. For example, the different external response systems 180 may be associated with different support systems for the enterprise organization. Additionally, the different external response systems 180 may be tasked with executing different automated responses. After determining the automated response, the automated response computing platform 110 may determine the external response system 180 that is tasked with executing the automated response. Then, the automated response computing platform 110 may route, using the issue routing engine 114 and based on the factors listed above, the issue and/or user feedback to the appropriate external response system 180.

At step 216, the automated response computing platform 110 may transmit the automated response. For example, after determining the automated response, the automated response computing platform 110 may transmit one or more commands directing the external response system 180 to execute the automated response. In some examples, the automated response may route the issue and/or the user feedback to the appropriate external response system 180. Thus, at step 216, after determining the appropriate external response system 180, the automated response computing platform 110 may transmit or route the user feedback, the issue, and/or additional actions and/or responses to the appropriate external response system 180.

Figure 4:
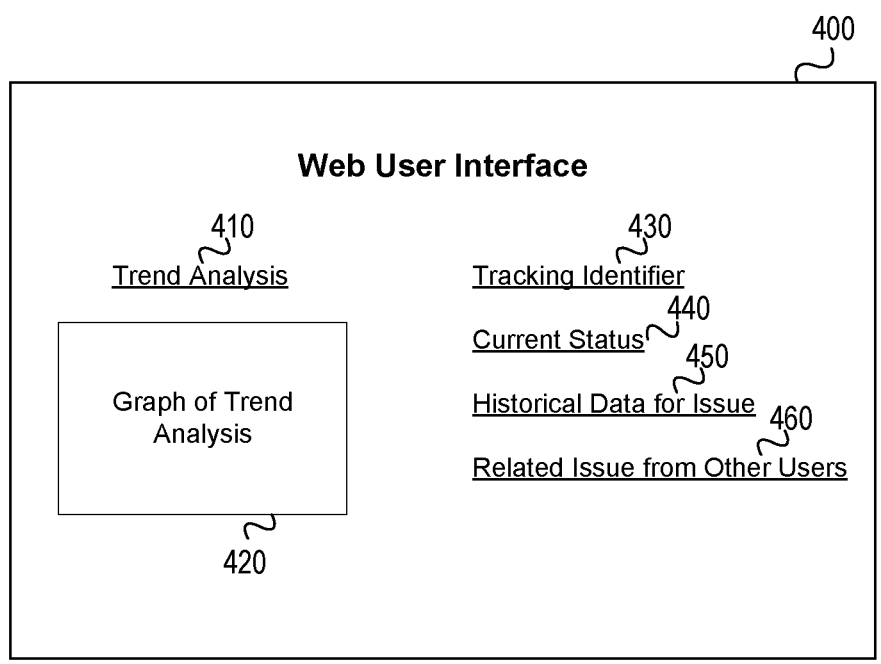

At step 217, the automated response computing platform 110 may generate a user interface for the user feedback. For example, the automated response computing platform 110 may generate, using the user interface module 115, a user interface for the user feedback. As shown in FIG. 4, graphical user interface 400 may include one or more fields, controls, and/or other elements that may allow a user (e.g., an administrator and/or a user) to interact with links and/or identify information associated the user feedback. For example, the graphical user interface 400 may allow a user and/or an administrator to use links and/or graphs to view the trend analysis 410, the graph of the trend analysis 420, the tracking identifier 430, the current status 440, the historical data for issue 450, and/or related issues from other users 460. The trend analysis and/or the graph of the trend analysis 420 may correspond to the determined trends associated with the user feedback at step 214. The tracking identifier 430 may correspond with the generated tracking identifier at step 206. The historical data for the issue 450 may correspond with the retrieved hierarchy information for the clients at step 208 and/or the hierarchy information for user feedback at step 209. The related issue from other users 460 may correspond to the retrieved hierarchy information for issues at step 210. Using graphical user interface 400, the user may be able to obtain real-time live updates corresponding to the issue identified at step 203. Further, the current status 440 may identify a status of the user feedback, such as completed, in progress, or need more assistance. Additionally, the current status 440 may identify the automated response determined at step 215. The administrator may use graphical user interface 400 to determine the issue, automated response, and/or assess the performance of the automated response.

Figure 2E:
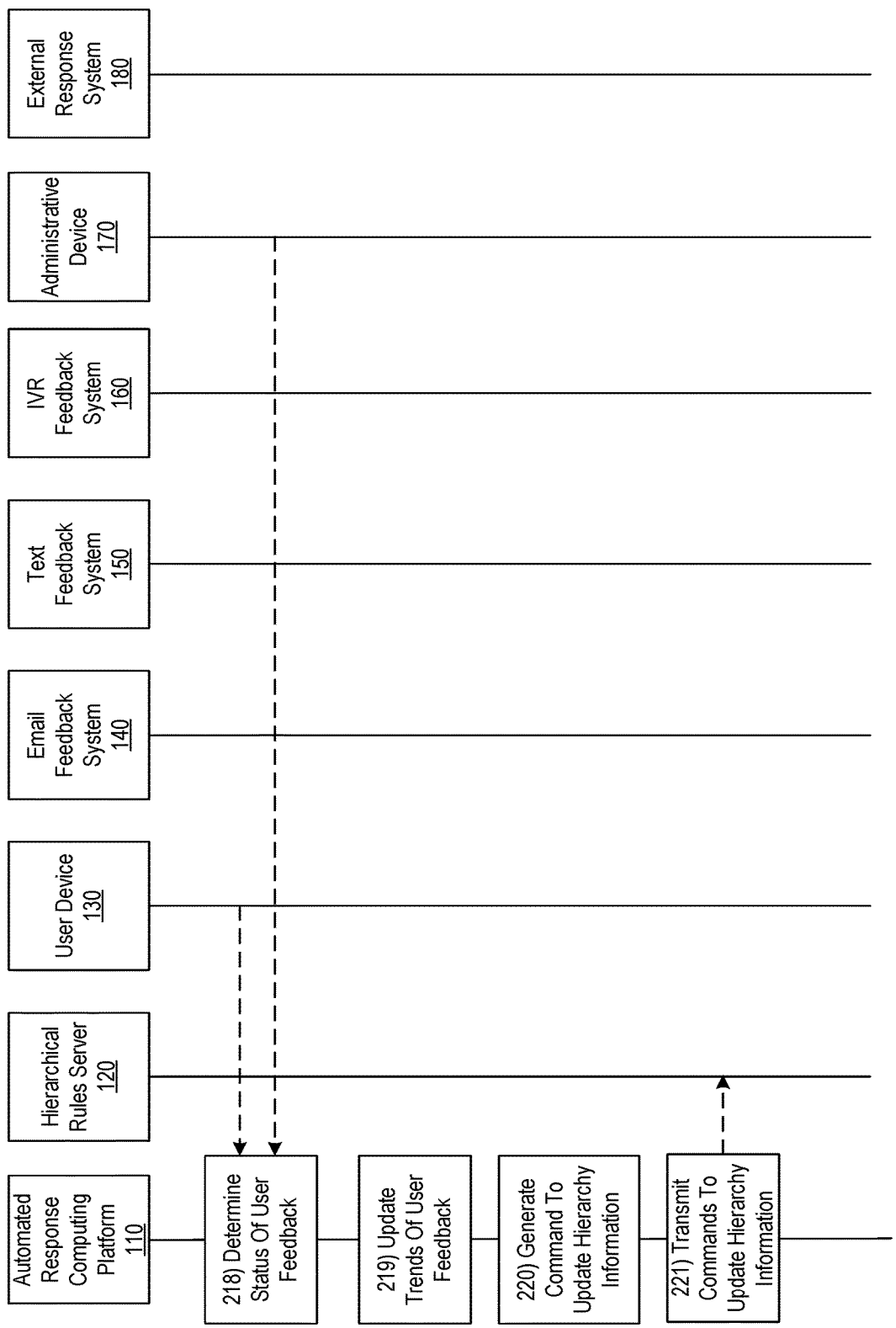

Referring to FIG. 2E, at step 218, the automated response computing platform 110 may determine a status of the user feedback based on the automated response. In some instances, after transmitting the one or more commands to execute the automated response, the automated response computing platform 110 may monitor whether new user feedback indicating the identified client and/or the identified issue has been received within a pre-defined period of time. After receiving the new user feedback indicating the identified client and/or issue, the automated response computing platform 110 may determine the status of the user feedback as not completed. However, when new user feedback indicating the identified client and/or issue has not been received in the pre-defined period of time, the automated response computing platform 110 may determine the status of the user feedback as completed. Further, in some embodiments, the automated response computing platform 110 may monitor whether new user feedback indicating the identified client and/or the identified issue surpasses a pre-defined threshold. Based on monitoring whether the new user feedback has been received in a pre-defined period of time and/or whether the new user feedback surpasses a pre-defined threshold, the automated response computing platform may update the performance for the automated response.

In some examples, after executing the determined automated response, the automated response computing platform 110 may transmit a request to the user device 130 and/or the administrative device 170 inquiring about the status. In response to the request, the automated response computing platform 110 may receive, from the user device 130 and/or administrative device 170, an input indicating whether the issue has been completed, in progress, or not resolved. For example, referring back to FIG. 4, the user and/or administrator may select the current status link 440 to input the current status of the user feedback.

At step 219, the automated response computing platform 110 may update the trends of the user feedback. For example, the automated response computing platform 110 may determine a client, issue, automated response, and/or status (e.g., performance) of the automated response as explained above. Based on the status or performance of the automated response, the automated response computing platform 110 may update, using the analytics module 116, the trends for the identified client, identified issue, and/or identified automated response. When the automated response computing platform 110 receives a new user feedback, the automated response computing platform 110 may use the new and updated trends to determine the automated response for the client and/or issue.

At step 220, the automated response computing platform 110 may generate one or more commands to update the hierarchy information based on the updated trends at step 219. For example, the automated response computing platform 110 may generate one or more commands to update the hierarchy information including the hierarchy ranking of the issues and/or the automated responses based on the updated trends. At step 221, the automated response computing platform 110 may transmit the commands to update the hierarchy information to the hierarchal rules server 120. The hierarchal rules server 120 may receive the commands, and using the machine learning engine 125, may continuously update the hierarchy information based on new user feedback.

By updating the trends at step 219, the hierarchy information may also be updated. For example, the automated response computing platform 110 may analyze the status of the user feedback and may determine the automated response caused a change in status (e.g., completed, in progress, or not resolved). Then, the automated response computing platform 110 may generate one or more commands to add, remove, and/or change the hierarchy ranking of the issue and/or the automated responses based on the status or performance of the user feedback. For instance, the one or more commands may move the automated response in the hierarchy ranking of the automated responses up or down in the hierarchy ranking. Additionally, and/or alternatively, after updating the trends, the automated response computing platform 110 may transmit these updated trends to the hierarchical rules server 120. After receiving these commands, the hierarchical rules server 120 may monitor and/or update, using machine learning engine 125, the hierarchy ranking for the issue and/or the automated responses. In some instances, after receiving the status of each user feedback, the hierarchical rules server 120 may monitor and/or update the hierarchy ranking for the issue and/or the automated responses. Thus, the hierarchical rules server 120 may continue to set, define, and/or iteratively redefine optimization rules, techniques and/or other parameters used by hierarchical rules server 120 and/or the automated response computing platform 110 in determining the automated responses. For example, the hierarchical rules server 120 may continuously add, change, and/or remove issues, and/or automated responses from the hierarchy rankings as user feedback is analyzed.

Further, in some embodiments, a particular client and/or a particular issue may be associated with an individual hierarchy ranking of automated responses. In such instances, the automated response computing platform 110 may determine unique hierarchy rankings of automated responses for the particular clients and/or particular issues. Then, the automated response computing platform 110 may add, remove, and/or change the hierarchy ranking of the automated responses for particular clients and/or issues based on the determined status. For example, the status of the user feedback may indicate "completed" for the particular client and/or issue. The automated response computing platform 110 may add or change (e.g., move up) the automated response in the hierarchy ranking of automated responses for the client and/or issue. In other examples, the status of the user feedback may indicate "not resolved" for the particular client and/or issue. The automated response computing platform 110 may remove or change (e.g., move down) the automated response in the hierarchy ranking of automated responses for the client and/or issue.

Figure 5:
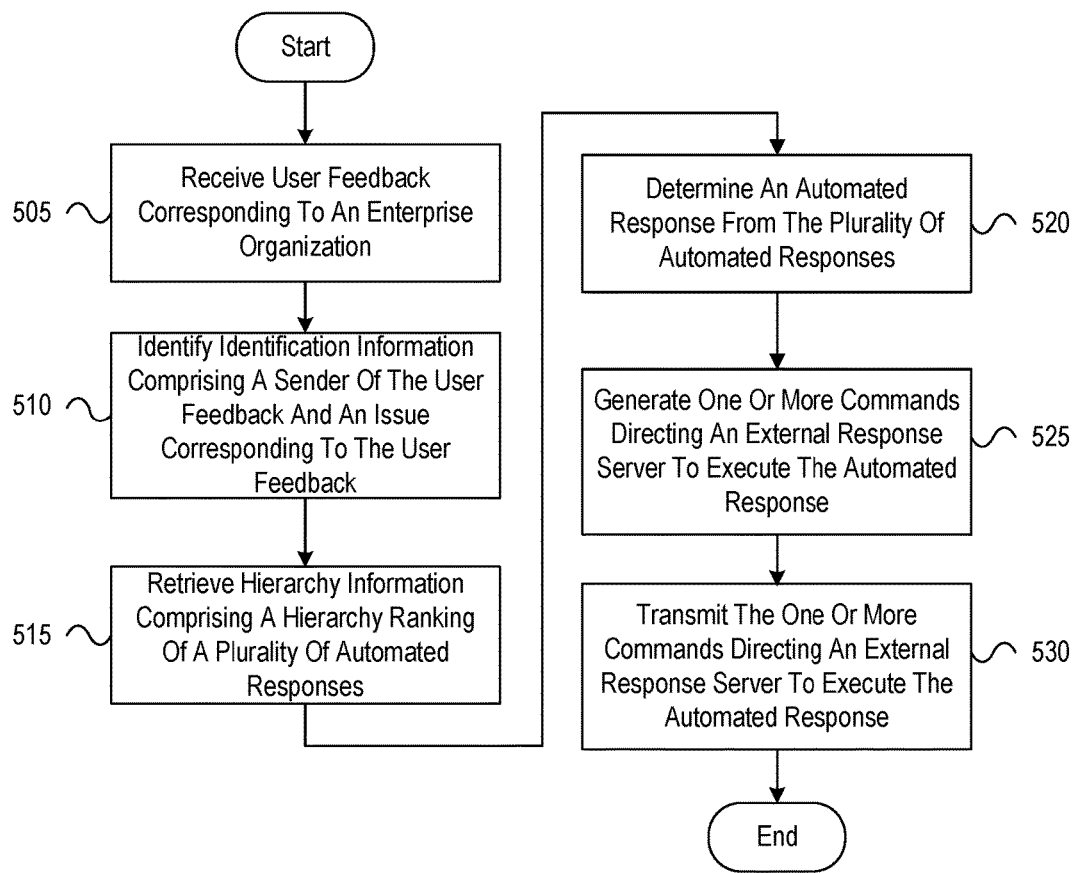
FIG. 5 depicts an illustrative method for analyzing smart data using an automated response system in accordance with one or more example embodiments.

FIG. 5 depicts an illustrative method for analyzing smart data using an automated response system in accordance with one or more example embodiments. Referring to FIG. 5, at step 505, a computing platform having at least one processor, a memory, and a communication interface may receive, by the at least one processor, via the communication interface, and from a user device, user feedback information comprising user feedback corresponding to an enterprise organization. At step 510, the computing platform may identify, based on the user feedback information, identification information comprising a sender of the user feedback and an issue corresponding to the user feedback. At step 515, the computing platform may retrieve, from a hierarchical rules server and based on the identification information, hierarchy information comprising a hierarchy ranking of a plurality of automated responses. At step 520, the computing platform may determine, based on analyzing the hierarchy information and the user feedback, an automated response from the plurality of automated responses. At step 525, the computing platform may generate, by the at least one processor, one or more commands directing an external response server to execute the automated response. At step 530, the computing platform may transmit, via the communication interface and to the external response server, the one or more commands directing an external response server to execute the automated response.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, by the at least one processor, via the communication interface, and from a user device, user feedback information comprising user feedback corresponding to an enterprise organization;
   identify, based on the user feedback information, identification information comprising a sender of the user feedback and an issue corresponding to the user feedback;
   retrieve, from a hierarchical rules server and based on the identification information, hierarchy information comprising a hierarchy ranking of a plurality of automated responses;
   escalate the user feedback based on a number of times the sender of the user feedback submitted previous user feedback associated with the issue;
   in response to the escalating, move a subset of the plurality of automated responses in the hierarchy ranking of the plurality of automated responses;
   determine, based on analyzing the hierarchy information and the user feedback, an automated response from the subset of the plurality of automated responses;
   generate, by the at least one processor, one or more commands directing an external response server to execute the automated response; and
   transmit, via the communication interface and to the external response server, the one or more commands directing an external response server to execute the automated response.

2. The computing platform of claim 1, wherein the memory stores additional computer-readable instructions that, when executed by the at least one processor, further causes the computing platform to:
   retrieve, from the hierarchical rules server and based on the identification information, historical information corresponding to the sender of the user feedback, and
   wherein the determining the automated response from the plurality of automated responses is further based on the historical information.

3. The computing platform of claim 1, wherein the memory stores additional computer-readable instructions that, when executed by the at least one processor, further causes the computing platform to:
   retrieve, from the hierarchical rules server and based on the identification information, historical information corresponding to the issue, and
   wherein the determining the automated response is further based on the historical information.

4. The computing platform of claim 3, wherein the historical information of the issue comprises historical information from a plurality of user feedback and from a plurality of different senders.

5. The computing platform of claim 1, wherein the memory stores additional computer-readable instructions that, when executed by the at least one processor, further causes the computing platform to:
   determine, based on the user feedback information, a biometric factor corresponding to the user feedback, and
   wherein the determining the automated response from the plurality of automated responses is based on the biometric factor.

6. The computing platform of claim 1, wherein the receiving the user feedback information comprises receiving the user feedback information from the user device via an email feedback system, a text feedback system, or an interactive voice response feedback system.

7. The computing platform of claim 1, wherein the hierarchy information further comprises a hierarchy ranking of a plurality of issues, and wherein the memory stores additional computer-readable instructions that, when executed by the at least one processor, further causes the computing platform to:
   determine, based on comparing the issue with the hierarchy ranking of the plurality of issues, the hierarchy ranking of the issue, and
   wherein the determining the automated response from the plurality of automated responses is further based on the hierarchy ranking of the issue.

8. The computing platform of claim 1, wherein the memory stores additional computer-readable instructions that, when executed by the at least one processor, further causes the computing platform to:
   receive, via the communication interface and from the external response server, a status of the user feedback; and
   change, based on the status of the user feedback, the automated response in the hierarchy ranking of the plurality of automated responses.

9. The computing platform of claim 1, wherein the memory stores additional computer-readable instructions that, when executed by the at least one processor, further causes the computing platform to:
   generate a web user interface corresponding to the user feedback, wherein the web user interface indicates the automated response and a status update for the user feedback; and
   transmit, via the communication interface and to the user device, the web user interface.

10. The computing platform of claim 1, wherein the memory stores additional computer-readable instructions that, when executed by the at least one processor, further causes the computing platform to:
    determine a trend for each of the plurality of automated responses, wherein the trend corresponds to an efficiency of a corresponding automated response from the plurality of automated responses; and
    change, based on the trend for each of the plurality of automated responses, the hierarchy ranking of the plurality of automated responses.

11. The computing platform of claim 1, wherein the memory stores additional computer-readable instructions that, when executed by the at least one processor, further causes the computing platform to:
when the number of times exceeds a first predetermined threshold during a first predetermined time duration, removing the subset of the plurality of automated responses from the plurality of automated responses for the issue.

12. The computing platform of claim 1, wherein the memory stores additional computer-readable instructions that, when executed by the at least one processor, further causes the computing platform to:
when the number of times is less than a second predetermined threshold during a second predetermined time duration, retaining the subset of the plurality of automated responses from the plurality of automated responses for the issue.

13. A method, comprising:
at a computing platform comprising at least one processor, memory, and a communication interface:
receiving, by the at least one processor, via the communication interface, and from a user device, user feedback information comprising user feedback corresponding to an enterprise organization;
identifying, based on the user feedback information, identification information comprising a sender of the user feedback and an issue corresponding to the user feedback;
retrieving, from a hierarchical rules server and based on the identification information, hierarchy information comprising a hierarchy ranking of a plurality of automated responses;
escalating the user feedback based on a number of times the sender of the user feedback submitted previous user feedback associated with the issue;
in response to the escalating, moving a subset of the plurality of automated responses in the hierarchy ranking of the plurality of automated responses;
determining, based on analyzing the hierarchy information and the user feedback, an automated response from the subset of the plurality of automated responses;
generating, by the at least one processor, one or more commands directing an external response server to execute the automated response; and
transmitting, via the communication interface and to the external response server, the one or more commands directing an external response server to execute the automated response.

14. The method of claim 13, further comprising:
retrieving, by the at least one processor, from the hierarchical rules server, and based on the identification information, historical information corresponding to the sender of the user feedback, and
wherein the determining the automated response from the plurality of automated responses is further based on the historical information.

15. The method of claim 13, further comprising:
retrieving, by the at least one processor, from the hierarchical rules server, and based on the identification information, historical information corresponding to the issue, and
wherein the determining the automated response is further based on the historical information.

16. The method of claim 13, further comprising:
determining, by the at least one processor and based on the user feedback information, a biometric factor corresponding to the user feedback, and
wherein the determining the automated response from the plurality of automated responses is based on the biometric factor.

17. The method of claim 13, wherein the hierarchy information further comprises a hierarchy ranking of a plurality of issues, and wherein the method further comprises:
determining, by the at least one processor and based on comparing the issue with the hierarchy ranking of the plurality of issues, the hierarchy ranking of the issue, and
wherein the determining the automated response from the plurality of automated responses is further based on the hierarchy ranking of the issue.

18. The method of claim 13, further comprising:
determining, by the at least one processor, a trend for each of the plurality of automated responses, wherein the trend corresponds to an efficiency of a corresponding automated response from the plurality of automated responses; and
changing, by the at least one processor and based on the trend for each of the plurality of automated responses, the hierarchy ranking of the plurality of automated responses.

19. The method of claim 13, further comprising:
generating a web user interface corresponding to the user feedback, wherein the web user interface indicates the automated response and a status update for the user feedback; and
transmitting, via the communication interface and to the user device, the web user interface.

20. One or more non-transitory computer-readable media storing instructions that, when executed by a computing platform comprising at least one processor, memory, and a communication interface, cause the computing platform to:
receive, by the at least one processor, via the communication interface, and from a user device, user feedback information comprising user feedback corresponding to an enterprise organization;
identify, based on the user feedback information, identification information comprising a sender of the user feedback and an issue corresponding to the user feedback;
retrieve, from a hierarchical rules server and based on the identification information, hierarchy information comprising a hierarchy ranking of a plurality of automated responses;
escalate the user feedback based on a number of times the sender of the user feedback submitted previous user feedback associated with the issue;
in response to the escalating, move a subset of the plurality of automated responses in the hierarchy ranking of the plurality of automated responses;
determine, based on analyzing the hierarchy information and the user feedback, an automated response from the subset of the plurality of automated responses;
generate, by the at least one processor, one or more commands directing an external response server to execute the automated response; and
transmit, via the communication interface and to the external response server, the one or more commands directing an external response server to execute the automated response.

* * * * *